Dec. 25, 1956       J. L. McCURDY ET AL       2,774,991
PROCESS FOR MAKING ELONGATED CELLULAR
ARTICLES FROM THERMOPLASTIC POLYMERS
Filed April 17, 1952
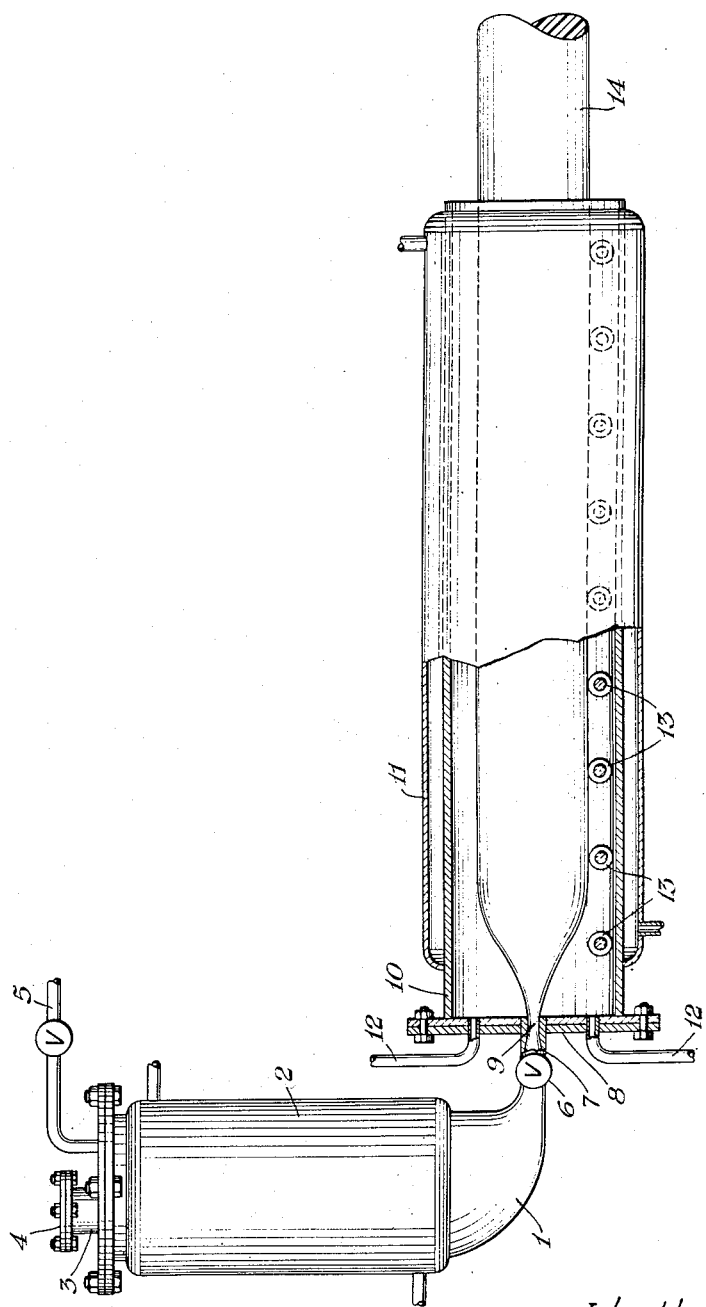
INVENTORS
John Lloyd McCurdy
Chancey E. DeLong
BY  Griswold & Burdick
ATTORNEYS

United States Patent Office 2,774,991
Patented Dec. 25, 1956

2,774,991

PROCESS FOR MAKING ELONGATED CELLULAR ARTICLES FROM THERMOPLASTIC POLYMERS

John Lloyd McCurdy, New London, Conn., and Chancey E. De Long, Midland, Mich., assignors to The Dow Chemical Company, Midland, Mich., a corporation of Delaware Application April 17, 1952, Serial No. 282,744

7 Claims. (Cl. 18—48)

This invention concerns an improved process for making an elongated thermoplastic cellular body from a mobile gel comprising a thermoplastic polymer of a monovinyl aromatic compound and a normally gaseous agent. It relates more particularly to procedure for carrying out the expansion of the mobile gel to form a cellular body composed for the most part of thin-walled individually-closed cells.

Cellular bodies of thermoplastic polymers of monovinyl aromatic compounds and methods of making the same are well known. McIntire, in U. S. Patent No. 2,450,436, describes a method of making a cellular body of a thermoplastic polymer wherein a mobile gel of a thermoplastic polymer, e. g. polystyrene, and a normally gaseous agent such as methyl chloride, methyl ether, propylene, or butylene, under pressure is caused to flow from a pressurizing chamber through a valve or aperture to a zone of lower pressure. Upon release of the pressure the normally gaseous agent vaporizes and expands the polymer to form a stable cellular body.

The mobile gel may be prepared by placing granules of a solid thermoplastic resin, e. g. of a molding grade of polystyrene, in a pressure resistant vessel, adding thereto a normally gaseous agent such as methyl chloride, methyl ether, propylene, butylene, etc., and maintaining the mixture under pressure until a homogeneous mobile, or flowable, gel is formed by dissolving of the normally gaseous agent in the thermoplastic polymer.

The procedure heretofore proposed for extruding the mobile gel under pressure into a zone of lower pressure, e. g. the atmosphere, where the normally gaseous agent vaporizes and expands the thermoplastic polymer to form a cellular body has not been entirely satisfactory for production of the cellular product on a commercial scale. For instance, upon release of the pressure by extrusion of the mobile gel into the atmosphere, the normally gaseous agent vaporizes and expands the polymer. Vapors of the normally gaseous agent escape into the atmosphere leaving a stable cellular product. The normally gaseous agent cools the polymer upon vaporizing and escapes from outer surfaces of the cellular product. Outer surfaces of the expanding polymer are thereby rapidly cooled and hardened, thus preventing further expansion and causing entrapment of a large proportion, e. g. a major proportion, of the gaseous agent in the cellular product. The entrapped gaseous agent is not only difficult to remove from the cellular product, since it must diffuse through walls of the individually-closed cells, but it is particularly troublesome when the cellular product is cut or sawed into boards, planks, panels, strips, etc., since the entrapped gaseous agent is liberated in part by such operations and is annoying and may create a hazardous, or explosive, mixture of the gaseous agent and air in the immediate area, unless adequate ventilation is provided. Also, the rapid lowering of the surface temperature of the expanding plastic mass to a point where the polymer becomes rigid while a major proportion of the gaseous agent remains entrapped within the mass, prevents the polymer from becoming fully expanded and frequently causes internal strains in the log, bar, or billet, which result in warping or distorting of boards, panels, or strips, of the cellular product cut therefrom.

It is an object of the invention to provide a method of expanding a mobile gel of a thermoplastic polymer and a normally gaseous agent to form an elongated cellular product so as to prevent rapid cooling of outer surfaces of the expanding plastic to temperatures substantially below that of the interior of the mass. Another object is to expand a mobile gel of a thermoplastic polymer of a monovinyl aromatic hydrocarbon and a normally gaseous agent to form an elongated cellular product by a procedure which removes a major proportion of the gaseous agent from the cellular product. Still another object is to provide an improved method for the production of the cellular products wherein the mobile gel is expanded under controlled temperature conditions. Other objects will be apparent from the following description of the invention.

According to the invention, the foregoing and related ends can be attained by extruding a mobile gel of a thermoplastic polymer, e. g. polystyrene, and a normally gaseous agent such as methyl chloride, methyl ether, propylene, or butylene, under pressure and at a temperature below the critical temperature of the normally gaseous agent, into a heated zone of lower pressure, suitably a chamber open to the atmosphere. The temperature within said zone is maintained sufficiently high to prevent rapid cooling of outer surfaces of the expanding plastic to a point at which it becomes rigid prior to complete expansion of the polymer and permits vapors of the normally gaseous agent to completely expand the polymer, and at the same time allows the gaseous agent to readily escape from the cellular polymer. The temperature of the zone of lower pressure is usually maintained at from 50° to 150° C. preferably at from 80° to 120° C. A stream of air or other gas may be passed through the chamber, i. e. through the annulus between outer surfaces of the expanding plastic and inner walls of the chamber, to displace the vapors of the normally gaseous agent therefrom. The air or other gas, e. g. nitrogen, carbon dioxide, or helium, provides positive displacement of the vapors of the normally gaseous agent from the chamber. The air, or gas, may be heated to avoid cooling of outer surfaces of the expanding polymer to a temperature substantially below that of the interior of the mass.

By extruding the mobile gel into a heated zone of lower pressure such as an elongated chamber comprised of a tube or other passageway open to the atmosphere and of suitable size to permit the mobile gel to expand completely without restraining contact of the cellular product against inner walls of the chamber, and maintaining outer surfaces of the expanding plastic at a temperature sufficiently high to prevent hardening of the same until the expansion is complete, the normally gaseous agent fully expands the thermoplastic polymer and in so doing is more completely removed from the cellular product than when the external heating is omitted.

The invention may be illustrated with reference to the accompanying drawing which is a diagrammatic sketch, partly in section, of an arrangement of apparatus suitable for practice of the invention, showing an enlargement of an open chamber wherein the mobile gel is expanded.

In the drawing, the numeral 1 designates a pressure resistant vessel which is provided with a jacket 2 having an inlet and outlet as shown for passing a heating or cooling medium therethrough. At the top, the vessel 1 is provided with an inlet 3, having a tightly fitting cap 4, which may be removed when a thermoplastic polymer or other solid material is to be introduced into the vessel. Toward its top the vessel is provided with a valved inlet 5 for introducing a gas or a normally gaseous agent. The lower section of the vessel 1 is in the form of a goose neck, the smaller end of which connects with valve 6. Valve 6 is connected with outlet 7. Outlet 7 is connected to plate 8. Outlet 7 contains an orifice 9 of suitable dimensions. The orifice 9 may be of any desired configuration, e. g. circular, rectangular, or square. The plate 8 is connected to an open chamber 10 by any suitable means, e. g. bolts. Alternatively, the open chamber may be positioned adjacent to said die plate at a distance of from one to three feet or more therefrom. The chamber 10 may be of circular, square or rectangular cross-section and is usually of a length sufficient to permit complete expansion of the polymer to a cellular body prior to discharge of the latter therefrom into the atmosphere. The chamber 10 is provided with a jacket 11, suitably in two or more sections, with an inlet and outlet for passing heating or cooling medium therethrough. The chamber 10 is provided with one or more inlets 12 for passing air or other gas through the open chamber. The jacket may be omitted and the air or other gas fed to the open chamber to displace vapors of the normally gaseous agent therefrom, be fed thereto with heating or cooling of said gas to maintain a desired temperature within the open chamber 10. The expanding plastic travels through the chamber 10 over guide rolls 13 which rolls may be driven by an electric motor (not shown), preferably through a variable speed gear assembly. The cellular product 14 is discharged, or is drawn away, from the open end of chamber 10 in any usual way, e. g. it may be pulled or carried away by hand, or by mechanical means.

The method herein disclosed may be employed in the production of cellular products from the solid thermoplastic benzene-soluble polymers and copolymers of monovinyl aromatic compounds such as the monovinyl aromatic hydrocarbons of the benzene series having the vinyl radical directly attached to a carbon atom of the aromatic nucleus and nuclear halogenated derivatives thereof. Among such monovinyl aromatic compounds are styrene, vinyltoluene, vinylxylene, ethylvinylbenzene, para-chlorostyrene, meta-chlorostyrene, para-isopropylstyrene, para-bromostyrene, and ethylvinyltoluene. Copolymers of any two or more of such monovinyl aromatic compounds may also be used. The method may also be used in producing cellular products from thermoplastic resins such as polymethylmethacrylate, and copolymers of methylmethacrylate and styrene, or copolymers of styrene and alpha-methylstyrene.

Normally gaseous agents which may be employed in practice of the invention are soluble, or at least partially soluble, in the thermoplastic resin under the conditions of temperature and pressure employed. Suitable normally gaseous agents are methyl chloride, methyl ether, propylene, butylene, or dichlorodifluoromethane. Methods of preparing a mobile gel from a thermoplastic resin and such normally gaseous agents are well known and need not be described here. The normally gaseous agent is usually employed in amount corresponding to from 6 to 25, preferably from 8 to 20, percent by weight of the polymer used.

The process may be carried out by extruding a mobile gel comprising a thermoplastic resin, e. g. polystyrene, having one or more of the aforementioned normally gaseous agents dissolved therein under pressure in the desired amount, and at a temperature between 60° and 130° C., preferably from 80° to 120° C., through a constricted passageway into a zone of lower pressure in an open chamber adjoining the passageway, suitably a chamber open to the atmosphere, wherein, the mobile gel expands while passing therethrough. The mobile gel is allowed to expand freely within the chamber, i. e. out of restraining contact with inner walls of the chamber. The zone of lower pressure within the chamber is maintained at a desired temperature between 50° and 150° C. in any usual way, e. g. by external heating or cooling of the chamber. Air or other gas is preferably passed therethrough to displace or sweep vapors of the normally gaseous agent from the chamber. The cellular product may be moved through the chamber by any suitable means, e. g. by means of a moving belt or rolls. The cellular product may be pulled or carried away from the discharge end, i. e. the open end, of said chamber as it is formed, by mechanical means, or by hand. The method is advantageously employed in the production of elongated cellular bodies, e. g. logs, billets, or planks, the smallest dimension of which is at least two inches, or greater. It is important in carrying out the process that the expanding plastic be maintained at temperatures which avoid hardening of outer surfaces of the same to plastic flow by vapors of the gaseous agent, prior to escape of a major proportion of the normally gaseous agent from the mass in order to permit the gaseous agent to fully expand the polymer. In general, the expanding plastic may be passed through a zone of lower pressure which is maintained at temperatures between 50° and 150° C., preferably from 80° to 120° C. where the polymer is expanded to a cellular body and is maintained in said zone for a time of from 20 second to 15 minutes or longer. The temperature employed is dependent in part upon the time for which the cellular mass is maintained in the chamber. The plastic mass should not be heated under time and temperature conditions which cause collapse or fusing of the cellular product.

In producing cellular polystyrene by the present method, a mobile gel comprising a molding grade polystyrene, together with from 6 to 25 per cent by weight of a normally gaseous agent, e. g. methyl chloride, dissolved therein under pressure, is caused to flow from the vessel 1 by opening valve 6. The gel flows through outlet 7 and the orifice 9 into chamber 10, which latter is open to the atmosphere at its discharged end. The gel flows from the vessel 1 due to the pressure therein and expands in chamber 10 to form the cellular product. The chamber 10 is heated or cooled as required to maintain a temperature within said chamber of from 50° to 150° C. during expansion of the polystyrene. Air or other gas may be fed into the chamber via inlets 12 to provide a positive displacement of vapors of the normally gaseous agent from the chamber. The cellular product moves through the chamber 10 over guide rolls 13 out of contact with inner walls of the chamber. The chamber 10 may be of any desired shape or length, i. e. it may be of round, square, or rectangular, cross-section and from 2 to 30 feet or more in length. In general, the larger the cross-section of the cellular log, bar, plank, or billet, being formed, the longer the chamber that is required in order to permit complete expansion of the polymer, and diffusion and escape of a major proportion of the normally gaseous agent from the celular product. The cross-section of the chamber needs to be only sufficiently greater than that of the cellular product so as to permit the latter to pass therethrough out of restraining contact with inner walls of the chamber. The cellular product is withdrawn or carried away from the discharge end of the chamber 10 and is cut or sawed into any desired lengths convenient for handling. Vapors of the normally gaseous agent may be recovered in usual ways, e. g. by adsorption on charcoal or by cooling and liquifying of the same. The normally gaseous agent thus recovered may be reused in the process.

The following examples illustrate ways in which the principle of the invention has been applied, but are not to be construed as limiting the invention.

EXAMPLE 1

In each of a series of experiments, a mobile gel of 90 parts by weight of a molding grade polystyrene and 10 parts of methyl chloride under pressure was extruded at a temperature of 104° C. through a die plate containing a circular orifice one-half inch in diameter into a tubular chamber comprised of two identical flanged and jacketed sections, each two feet long, of a 4 inch internal diameter steel pipe. The sections were fastened together by bolts to form a chamber 48 inches long having the discharge end open to the atmosphere. The feed end of the chamber was held adjacent to the die plate by means of bolts. Inlets were provided adjacent to the die plate for passing air or gas through the tubular chamber. The mobile gel was extruded into the tubular chamber at a uniform rate while maintaining the interior of the chamber at approximately the temperatures stated in the following table by passing heating or cooling media, i. e. steam or water, through the jacket of said chamber, and passing air through the chamber in the direction of travel of the expanding plastic to displace vapors of the normally gaseous agent from the chamber. The air was passed through the annulus between outer surfaces of the expanding plastic and inner walls of the tubular chamber at a rate corresponding to a linear velocity of approximately 100 feet per minute. The mobile gel was extruded and expanded to form a cellular product at a rate corresponding to a linear movement of the cellular product of 10 feet per minute. The mobile gel was permitted to expand freely in the tubular chamber as it moved therethrough along the longitudinal axis of the tube without outer surfaces of the expanding plastic being in restraining contact with inner walls of the tube. The contact time, i. e. the time required for an infinitesimal portion of the polymer to traverse the length of the tubular chamber was approximately 25 seconds. The cellular product from each of the experiments was analyzed for per cent methyl chloride. A density in pounds per cubic foot of the cellular mass was determined for each product. Table I identifies each experiment, and gives the temperature of the gel at the point of extrusion and the temperature in the tubular chamber during expansion of the mobile gel. The table also gives the per cent by weight of methyl chloride in the cellular product and the density in pounds per cubic foot determined for each product.

Table I

| Run No. | Gel Temp., °C. | Chamber Temp., °C. | Cellular Product | |
| --- | --- | --- | --- | --- |
| | | | Percent Methyl Chloride | Density, lbs./cu. ft. |
| 1 | 104 | 46 | 6.08 | 1.96 |
| 2 | 104 | 87 | 5.43 | 1.63 |
| 3 | 104 | 114 | 4.65 | 1.34 |
| 4 | 104 | 137 | 4.57 | 1.34 |

EXAMPLE 2

A mobile gel comprising 89.75 parts by weight of a molding grade polystyrene and 10.25 parts of methyl chloride was extruded and expanded by procedure similar to that described in Example 1 employing a tubular chamber comprised of three identical flanged and jacketed sections, each two feet long, of a 4 inch internal diameter steel tube. The sections were held together with bolts to form a chamber 72 inches long having the discharge end open to the atmosphere. Table II identifies each experiment by stating the gel temperature at the point of extrusion and the average temperature in the open space within the tubular chamber during expansion of the mobile gel. The table also gives the per cent by weight of methyl chloride in the cellular product and the density in pounds per cubic foot determined for each product. For purpose of comparison, the tubular chamber was removed and the mobile gel extruded into the atmosphere and allowed to expand freely by vaporization of the methyl chloride at room temperature (run No. 1).

Table II

| Run No. | Gel Temp., °C. | Chamber Temp., °C. | Cellular Product | |
| --- | --- | --- | --- | --- |
| | | | Percent Methyl Chloride | Density, lbs./cu. ft. |
| 1 | 104 | | 6.70 | 1.88 |
| 2 | 104 | 100 | 4.88 | 1.66 |
| 3 | 104 | 113 | 5.07 | 1.44 |
| 4 | 104 | 129 | 4.95 | 1.31 |

EXAMPLE 3

A mobile gel of 85.5 parts by weight of a molding grade polystyrene and 14.5 parts of methyl chloride was extruded at a temperature of 104° C. through a die plate containing a circular orifice having a diameter of one-half inch into a tubular chamber comprised of a 4 inch internal diameter steel pipe 72 inches long having the discharge end open to the atmosphere. The mobile gel was extruded and expanded to form a cellular product at a rate corresponding to a linear movement of the cellular product of 10 feet per minute along the axis of the tubular chamber. Air was passed through the annulus between outer surfaces of the expanding plastic and inner walls of the tubular chamber at a rate corresponding to a linear velocity of approximately 100 feet per second. The temperature in the open space within the tubular chamber was maintained at 99° C. during the expansion by passing steam through the jacket of said chamber. The cellular product was obtained as a circular billet or log having an average diameter of 3.25 inches and containing 6.3 percent by weight of methyl chloride. For purpose of comparison the tubular chamber was removed and the mobile gel was extruded into the atmosphere and allowed to expand freely by vaporization of the normally gaseous agent. The cellular product was a circular billet having an average diameter of only 2.5 inches and contained 8 percent by weight of methyl chloride.

EXAMPLE 4

A mobile gel of 90 parts by weight of a molding grade polystyrene and 10 parts of methyl chloride under pressure was extruded at a temperature of 101.5° C., through a die plate containing a horizontal slot ⅛ inch deep by 4½ inches wide, into the atmosphere and was fed prior to any substantial expansion of said gel, into an open chamber comprised of a horizontal metal tunnel 30 feet long by 2½ feet in diameter. The feed end of the tunnel was positioned at a distance of two feet from the die plate. The tunnel was provided with an inlet for feeding heated air into its mid-portion. The mobile gel was extruded and expanded in said tunnel at a rate corresponding to a linear movement of the cellular product of 6 feet per minute along the horizontal axis of the tunnel. The cellular product traveled through said tunnel over guide rolls and at a linear rate of speed corresponding to the rate of formation of the cellular product. Heated air at a temperature of 96° C. was passed into the mid-portion of the tunnel. The heated air was passed through the annulus between the expanding plastic and inner walls of the tunnel and toward each end of said tunnel at linear rates between 200 and 240 feet per minute. The air, together with vapors of the methyl chloride, was vented through outlets on each end of the tunnel. The temperature of the mobile gel was rapidly lowered from 101.5° C. to 86° C. upon initial release of the pressure and vaporization of the normally gaseous agent, but remained substantially constant at 86° C. during expansion of the polymer to form a cellular product for a principal part of its travel through the tunnel. The cellular product was obtained as an elongated body having the dimensions of approximately 3¾ inches thick by 14 inches wide. The product had a density of 1.62 pounds per cubic foot and contained 4.6 percent by weight of methyl chloride.

Similar results to those given in the foregoing examples have been obtained employing propylene, dichlorodifluoromethane, and a mixture of methyl ether and methyl chloride, as the normally gaseous agent in the preparation of cellular articles from polystyrene.

Other modes of applying the principle of the invention may be employed instead of those explained, change being made as regards the steps of compositions herein employed, provided the steps or compositions stated in any of the following claims, or the equivalent of such steps or compositions be employed.

We claim:

1. In a method for the production of an elongated thermoplastic cellular body, the smallest dimension of which is at least two inches, from a mobile gel comprising a thermoplastic polymer having a normally gaseous agent dissolved therein under pressure, wherein the mobile gel is extruded from a pressurized vessel containing the same at a temperature between 60° and 130° C. into a zone of lower pressure wherein the normally gaseous agent vaporizes and expands the polymer to form a cellular product, the steps which consist in expanding the polymer to form a cellular product in a zone of lower pressure maintained at temperatures between 50° and 150° C. in an open chamber and without restraining contact of the cellular product against inner walls of said chamber and maintaining the cellular product within said open chamber for a time of from 20 seconds to 15 minutes to complete the expansion of the polymer and permit the diffusion of a major proportion of the normally gaseous agent from the cellular product and withdrawing the cellular product from said open chamber.

2. A method as described in claim 1, wherein the thermoplastic polymer consists of at least one polymerized monovinyl aromatic hydrocarbon of the benzene series.

3. A method as claimed in claim 1, wherein the mobile gel comprises a thermoplastic polymer consisting of at least one polymerized monovinyl aromatic hydrocarbon of the benzene series having a normally gaseous agent dissolved therein under pressure in amount corresponding to from 6 to 25 percent by weight of the polymer.

4. A method as claimed in claim 3, wherein the thermoplastic polymer is polystyrene.

5. A method as claimed in claim 3, wherein air is passed through the annulus between the outer surfaces of the cellular product and inner walls of the open chamber to displace vapors of the normally gaseous agent from said chamber.

6. In a method for the production of an elongated thermoplastic cellular body, the smallest dimension of which is at least two inches, from a mobile gel comprising polystyrene having from 8 to 20 percent by weight of a normally gaseous agent dissolved therein under pressure, wherein the mobile gel is extruded from a pressurized vessel containing the same at a temperature between 80° and 120° C. into a zone of lower pressure wherein the normally gaseous agent vaporizes and expands the polystyrene to form a cellular product, the steps which consist in expanding the polystyrene to form a cellular product in a zone of lower pressure maintained at temperatures between 50° and 150° C. in an open chamber and without restraining contact of the cellular polystyrene against inner walls of said chamber and maintaining the cellular polystyrene within said chamber for a time of from 20 seconds to 15 minutes to complete the expansion of the polystyrene and permit diffusion of the normally gaseous agent from the cellular product while passing air through the annulus between outer surfaces of the cellular polystyrene and inner walls of the open chamber to displace vapors of the normally gaseous agent from said chamber.

7. In a method for the production of an elongated thermoplastic cellular body, the smallest dimension of which is at least two inches, from a mobile gel comprising a thermoplastic polymer having a normally gaseous agent dissolved therein under pressure, wherein the mobile gel is extruded from a pressurized vessel containing the same at a temperature between 60° and 130° C. into a zone of lower pressure wherein the normally gaseous agent vaporizes and expands the polymer to form a cellular product, the steps which consist in feeding the newly formed cellular product into a heated zone maintained at temperatures between 50° and 150° C. and at said lower pressure in an open chamber and maintaining the cellular product within said open chamber for a time of from 20 seconds to 15 minutes to complete the expansion of the polymer and permit the diffusion of a major proportion of the normally gaseous agent from the cellular product and withdrawing the cellular product from said open chamber.

References Cited in the file of this patent

UNITED STATES PATENTS

| | | |
|---|---|---|
| 2,537,977 | Dulmage | Jan. 16, 1951 |
| 2,576,977 | Stober | Dec. 4, 1951 |